(12) United States Patent
Akiba et al.

(10) Patent No.: US 6,334,272 B1
(45) Date of Patent: Jan. 1, 2002

(54) FISHING ROD WITH INSERTED FISHLINE

(75) Inventors: Masaru Akiba; Masayuki Nakagawa; Tomoyoshi Tsurufuji, all of Saitama; Shunji Sunaga; Koichi Ito, both of Tokyo, all of (JP)

(73) Assignee: Daiwa Seiko, Inc., Tokyo (JP)

( * ) Notice: Subject to any disclaimer, the term of this patent is extended or adjusted under 35 U.S.C. 154(b) by 614 days.

(21) Appl. No.: 08/811,192

(22) Filed: Mar. 5, 1997

Related U.S. Application Data

(63) Continuation of application No. 08/291,995, filed on Aug. 18, 1994, now Pat. No. 5,647,162.

(30) Foreign Application Priority Data

| Aug. 24, 1993 | (JP) | 5-50476 |
| Sep. 1, 1993 | (JP) | 5-240441 |
| Dec. 24, 1993 | (JP) | 5-73958 |
| Jul. 20, 1994 | (JP) | 6-189872 |

(51) Int. Cl.[7] .................................................. A01K 87/04
(52) U.S. Cl. ............................................................ 43/24
(58) Field of Search ................................. 43/18.1, 18.5, 43/24

(56) References Cited

U.S. PATENT DOCUMENTS

| 4,209,931 A | * | 7/1980 | Vance | 43/24 |
| 5,488,797 A | * | 2/1996 | Akiba | 43/18.1 |
| 5,564,214 A | * | 10/1996 | Tsurufuji | 43/24 |
| 5,647,162 A | * | 7/1997 | Akiba | 43/24 |

FOREIGN PATENT DOCUMENTS

| FR | 1332647 | * | 6/1963 | 43/18.1 |
| JP | 405276853 | | * 10/1993 | 43/18.1 |
| JP | 406141740 | | * 5/1994 | 43/18.1 |
| SU | 001717045 A | * | 3/1992 | 43/18.1 |

* cited by examiner

Primary Examiner—Kurt Rowan
(74) Attorney, Agent, or Firm—Liniak, Berenato, Longacre & White

(57) ABSTRACT

The invention concerns a fishing rod in which a fishline is passed through the inside thereof. In the fishing rod, one of front and rear rod pipes to be connected together is provided with an enlarged diameter portion for receiving an outer periphery of the other rod pipe. Such enlarged diameter portion reduces a difference between the inside diameters of the front and rear rod pipes, to thereby eliminate the possibility that the fishline can be abutted against the end portion of the rod pipes. Thus, the frictional resistance of the fishline can be decreased, so that the fishline can be smoothly drawn into and out of the rod pipes.

14 Claims, 9 Drawing Sheets

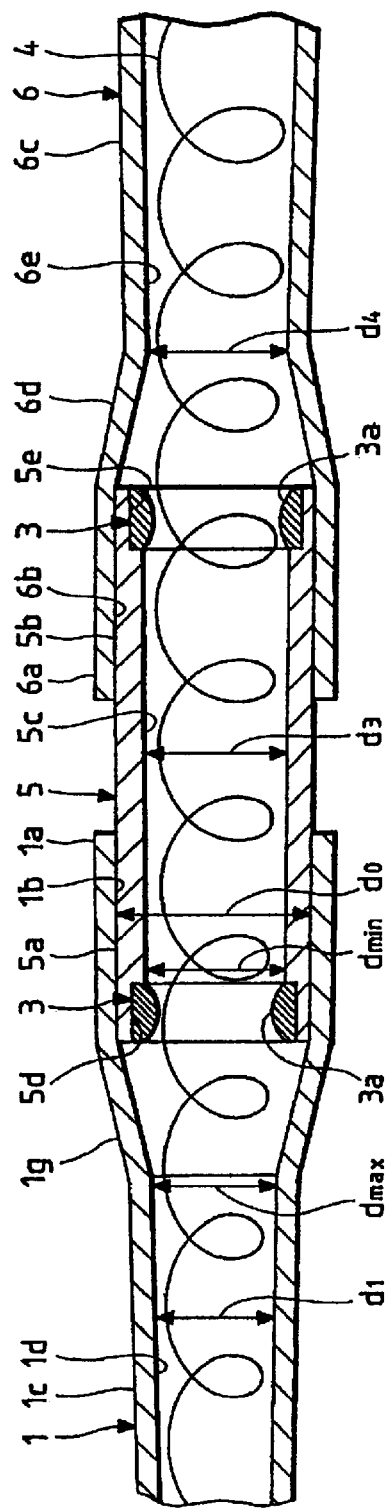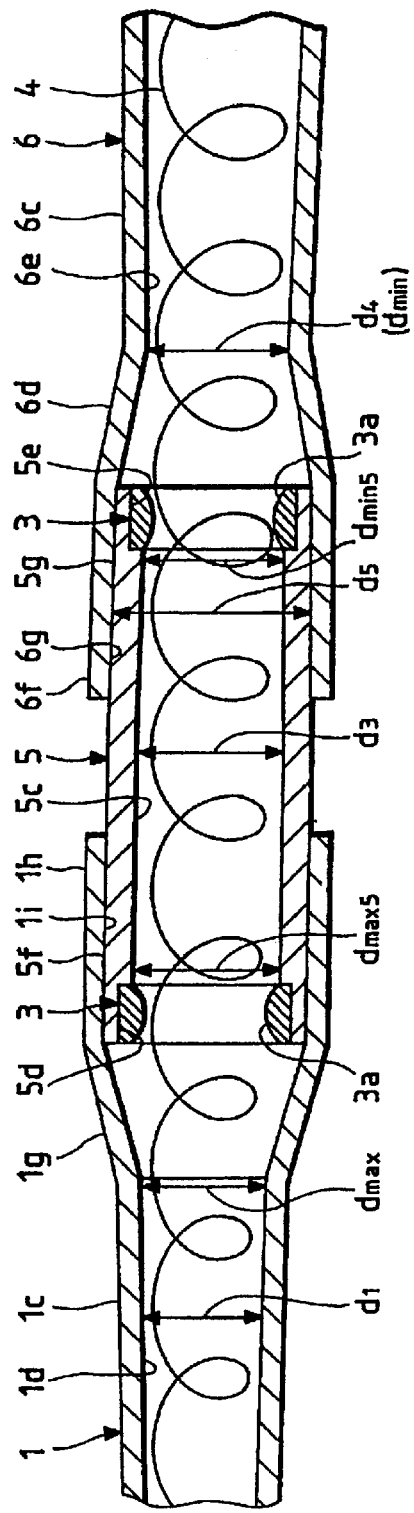

FISHING ROD WITH INSERTED FISHLINE

This application is a continuation of Ser. No. 08/291,995 filed Aug. 18, 1994 now U.S. Pat. No. 5,647,162.

BACKGROUND OF THE INVENTION

The present invention relates to a fishing rod with an inserted fishline (so-called "inter-line fishing rod") in which a fishline is inserted through rod pipes and is guided to the leading end portion of the fishing rod.

There has been known in the fishing rod art that the inter-line type fishing rod is advantageous over the conventional eye-let type fishing rod in responsibility and sensibility when the fish is hit since the vibration transmitted from the hook at the tip of the fishline to the fishline is received directly by the fishing rod. Further, the inter-line type fishing rod is free from the twine and tangle of the fishline and allows an easy fishing operation.

However, since the inter-line fishing rod employs the arrangement wherein the fishline passes through the inside of rod pipes, the inter-line type fishing rod generally suffers from a problem in that the friction between the fishline and the inner surface of the rod pipe is inevitably increased, which decreases the flying distance of the hook, and requires a larger force for winding the fishline.

Various attempts have been proposed in the art in order to reduce the friction in the inter-line type fishing rod. However, they are not satisfactory in practical use.

Japanese Utility Model Kokoku Publication No. Sho. 63-34525 discloses a telescopic type fishing rod with an inserted fishline in which a fishline is inserted through fishing pipes and is guided to the leading end portion of the fishing rod. In the disclosed fishing rod, since there are provided a large number of ring members each having an inside diameter sufficiently smaller than the inside diameter of the rod pipe, when fish is caught and the fishline is taken up together with the fish, even if the rod pipe is curved, the fishline is difficult to come into contact with the inner surface of the rod pipe and is also difficult to touch water drops attached to the inner surface of the rod pipe, so that the resistance of the fishline can be reduced. However, on the other hand, because the inside diameter of the ring member is small, when the fishline is cast, a great friction resistance can be produced between the small inside diameter and the fishline.

That is to say, in the fishing rod with an inserted fishline disclosed in the above publication, since rod pipes forming the fishing rod become sequentially smaller in diameter from a butt rod pipe to a tip rod pipe, the inside diameter of a fishline passage ring fixed to a tail plug threadedly engaged the rear portion of a rod pipe is considerably smaller than the inside diameter of the rod pipe.

On the other hand, when the fishline wound round a spool of a reel mounted on the fishing rod is drawn out through the inside of the rod pipe to the leading end portion of the fishing rod, since the fishline wound round the spool has a winding tendency, such fishline is difficult to be linear within the rod pipes but shows a spiral form so that the fishline passes through the rod pipe while it is often abutted against the inside walls of the rod pipes.

Therefore, when passing through the rod pipes, the fishline can be often abutted against the thick side surface of the fishline passage ring and also against the inner peripheral portions of small diameter rod pipes, whereby the fishline can be damaged easily and the frictional resistance of the fishline is increased, which makes it impossible to draw out the fishline from the leading end portion of the fishing rod smoothly.

That is to say, in the conventional fishing rod with an inserted fishline in which a plurality of small diameter rod pipes are sequentially connected to one another in front of a large diameter rod pipe, a fishline can be often abutted against the thick side surface of the fishline passage ring and also against the inner peripheral portions of the small diameter rod pipes, whereby the fishline can be damaged easily and the frictional resistance of the fishline is increased, so that the fishline cannot be drawn out from the leading end portion of the fishing rod smoothly.

Japanese Patent Kokai Publication No. Sho. 56-127032 discloses a fishing rod with an inserted fishline in which there are provided a large number of rings for guiding the fishline into rod pipes. The disclosed fishing rod with an inserted fishline has not only an ordinary object to prevent occurrence of the twined fishline but also another object to eliminate the possibility that the fishline can be in contact with the inner surfaces of rod pipes having a relatively high friction coefficient and the casting distance of the fishline can be thereby shortened.

However, as mentioned above, a fishline is wound round a spool of a reel and, for this reason, the fishline has a winding tendency. That is, in an ordinary fishing rod with an inserted fishline, when the fishline is played out, the fishline extends spirally not in a straight line and thus passes through the inner surfaces of the rod pipes while it is often abutted against them. Accordingly, when the fishline is played out in the disclosed construction of the fishing rod, the fishline is abutted against the side surfaces of the fishline guide rings, and thereafter passes through the guide rings while it is turning its direction suddenly in order to travel along the fishline passage hole of the guide rings. In this case, in fact, the resistance of the fishline is not small.

Japanese Utility Model Kokai Publication No. Sho. 63-169871 discloses a fishing rod with an inserted fishline in which a ceramics fiber layer is formed in the inner surfaces of rod pipes in order to improve the wear resisting property thereof. In this case, the ceramics fiber layer can truly improve the wear resisting property but, however, there are present on the ceramics fiber layer drops of water which have penetrated into the rod pipes and, especially, when the fishline is played out, the fishline can come into contact with the water drops, with the result that the resistance of the fishline is increased to a great extent. This gives rise to inconveniences in the fishing rod operation, for example, this makes it impossible to extend the fishline casting distance.

SUMMARY OF THE INVENTION

In view of the above-mentioned conventional circumstances, the present invention aims at eliminating the drawbacks found in the conventional fishing rod.

Accordingly, it is an object of the invention to provide a fishing rod with an inserted fishline which reduces differences between the inside diameters of rod pipes connected to one another to thereby prevent a fishline from being abutted against the end portions of the rod pipes and against fishline guide members and thus prevent the frictional resistance of the fishline from increasing, so that the fishline can be smoothly drawn out of and into the rod pipes.

Another object of the invention is to provide a fishing rod with an inserted fishline which can reduce the fishline resistance and thus, especially, allows the fishline to be played out smoothly.

Yet another object of the invention is to provide a fishing rod with an inserted fishline which can keep the water repellency of the inner periphery of a rod pipe for a long period of time and can draw in and out a fishline smoothly.

Further object of the invention to provide a fishing rod with an inserted fishline which is improved in balance between the inside diameters of fishline guide rings in a rod pipe including the top rod portion of the fishing rod and the inside diameter of the rod pipe to thereby reduce efficiently the resistance of the fishline when it is cast.

In order to attain the above-noted and other objects, the present invention provides a fishing rod with an inserted fishline including a plurality of rod pipes connected to one another, in which one of the rod pipes to be connected to each other is formed such that the inside diameter of the connecting portion thereof is large and the inside diameter of the nonn, connecting portion thereof is small, the middle portion of the one rod pipe between the inside diameters portions of the connecting and non-connecting portions thereof is formed in a tapered or stepped shape larger than the inside diameter tapered portion of the non-connecting portion, the other rod pipe is removably connected to the inside diameter portion of the connecting portion of the one rod pipe, the inside diameter of the non-connecting portion of the one rod pipe is so set as to be approximate to the inside diameter of the other rod pipe, in the inside portions of the tapered or stepped portion of the one rod pipe, there are provided two or more fishline guide members which respectively project out inwardly from the inside diameters portions of the two rod pipes.

The present invention further provides a fishing rod with an inserted fishline in which a fishline is inserted through a rod pipe reinforcedly formed of reinforcing fiber with resin as the matrix thereof, characterized in that two or more fishline guide members are provided only in the lower area of the inner periphery of the rod pipe, or two or more fishline guide members respectively including a thick lower portion and a thin upper portion are disposed in the inner surface of the rod pipe at distances from one another in the longitudinal direction of the rod pipe.

In the fishing rod with an inserted fishline according to the invention, the fishline guide members are provided in the lower portion of the inner periphery of the rod pipe in such a manner that the surface positions of the fishline guide members are higher than the inner surface of the rod pipe, and thus the water drops are caused to fall down off the surfaces of the guide members. For this reason, when the fishline passes along the surfaces of the fishline guide members, the fishline is prevented from coming into contact with the water drops to thereby be able to reduce the fishline resistance to a great extent.

The present invention further provides a fishing rod with an inserted fishline in which a fishline is inserted through a rod pipe reinforcedly formed of reinforcing fiber including resin as the matrix thereof, characterized in that a film layer is formed in the inner surface of the rod pipe, recessed and projected portions are formed on the surface of the film layer, and the recessed and projected portions are formed smoothly in such a manner that they are gently inclined from the base portion of the fishing rod toward the leading end portion thereof.

In the fishing rod with an inserted fishline according to the invention, since the film layer including the recessed and projected portion is formed on the inner surface of the rod pipe, drops of water are caused to fall down into the recessed portions of the film layer. For this reason, when the fishline passes through the rod pipe, it may be abutted against the projected portions of the uneven surface of the film layer but can be scarcely abutted against the recessed portions of the uneven surface, so that the fishline cannot come into contact with the water drops to thereby decrease the fishline resistance. Also, because the projected and recessed portions are formed smoothly such that they are gently inclined from the base portion of the fishing rod toward the leading end portion thereof, the projected and recessed portions never provide resistance to the fishline when the fishline is played out.

The present invention further provides a fishing rod with an inserted fishline in which a fishline is inserted through a rod pipe reinforcedly formed of reinforcing fiber as resin as the matrix thereof, characterized in that one or more spirally projecting stripes each having an angle of less than 45° with respect to the axis of the rod pipe are formed on the inner surface of the rod pipe.

In the fishing rod with an inserted fishline according to the invention, due to the fact that there are formed one or more spirally projecting stripes each having an angle of less than 45° with respect to the axis of the rod pipe, the water drops that have penetrated into the rod pipes can be discharged along the spirally projecting stripes in the leading end direction thereof simply by inclining the rod pipe forwardly. This prevents the fishline from coming into contact with the water drops. Also, because one or more spirally projecting stripes perform the function of the fishline guide members, the play-out and draw-in operations of the fishline are executed while the fishline is in contact with the spirally projecting stripe(s) and, even before the water drops are discharged out in the above-mentioned manner, the fishline is guided by the spirally-projecting stripe(s). This prevents the fishline from getting into contact with the water drops existing on the inner surface of the rod pipe lower in position than the spirally projecting stripe(s). Here, when the spirally projecting stripe has an angle close to 45°, a single spirally projecting stripe suffices but, as the angle becomes smaller, by forming two or more spirally projecting stripes, the fishline can be prevented against contact with the inner surface of the rod pipe of the fishing rod, that is, the spirally projecting stripes can perform the function of the fishline guide members.

The present invention further provides a fishing rod with an inserted fishline in which a fishline is inserted through a rod pipe reinforcedly formed of reinforcing fiber with resin as the matrix thereof, characterized in that a fishline guide member is provided in the inner surfaces of the rod pipe and, in the portion of the rod pipe located adjacent to the fishline guide member, there is formed a discharge hole which is used to discharge out drops of water externally of the rod pipe.

In the fishing rod with an inserted fishline according to the invention, the fishline guide member is provided on the inner surface of the rod pipe and the water drops that have collected between the fishline guide member and the rod pipe inner surface can be discharged out from a discharge hole formed adjacent to the fishline guide member. This prevents the fishline from coming into touch with the water droplets.

The present invention further provides a fishing rod with an inserted fishline in which a thin layer having a water repellent surface is formed on the inner peripheral surface of a rod pipe main body layer formed by winding a prepreg which is formed by impregnating or mixing high-strength fiber with resin, and two or more annular fishline guide members each having a wear resisting property are provided so as to project out inwardly from the water repellent surface of the thin layer.

Since the wear resisting annular fishline guide members are provided in a manner to project out from the water repellent surface of the thin layer, when the fishline is inserted, the fishline being pulled strongly can come into contact with the wear resisting annular guide members but is prevented from coming into direct contact with the soft water repellent surface of the thin layer. Therefore, the water repellent surface of the thin layer can stand long use and the fishline can be drawn in and out smoothly.

The present invention further provides a fishing rod with an inserted fishline in which a thin layer having a water repellent surface is formed on the inner peripheral surface of a rod pipe main body layer formed by winding a prepreg which is formed by impregnating or mixing high-strength fiber with resin, and the surface of the thin layer is formed in a mixed state which includes high-strength member having a wear resisting property and a water repellent portion.

Because the surface of the thin layer is formed in a mixed state which includes the wear resisting high-strength member and the water repellent portion, the contact of the fishline will be received by the wear resisting high-strength member so that the water repellent portion will not wear easily. Even when it is worn due to frequent use, the water repellent portion is recessed from the high-strength member to provide minute projections and recesses, so that the water repellent material thereof runs out or the water repellency thereof is lowered. However, if the minute projections and recesses are repaired, that is, if wax or the like is applied onto the surfaces of the minute projections and recesses, then the water repellent surface can be recovered again.

The present invention further provides a fishing rod with an inserted fishline in which a thin layer having a water repellent surface is formed on the inner peripheral surface of a rod pipe main body layer formed by winding a prepreg which is formed by impregnating or mixing high-strength fiber with resin, a fishline to be inserted into the rod pipe is provided with a water repellent property on the surface thereof, and the fishline uses a fine net line softer than the water repellent surface of the thin layer.

A thin layer having a water repellent property is formed on the inner periphery of a rod pipe main body and the surface of the fishline is also provided with a water repellent property, which makes it difficult for the water drops to penetrate into the rod pipe. Also, because the fishline employs net threads softer than the water repellent surface of the thin layer, there is eliminated the possibility that the thin layer having a water repellent property can be damaged by the fishline. Therefore, the water repellent surface of the rod pipe inner periphery can stand long use and also the fishline can be drawn in and out smoothly.

The present invention further provides a fishing rod with an inserted fishline in which three or more fishline guide rings are disposed in the inner surface area of a rod pipe including the top rod portion thereof that is tapered in a forwardly narrowing manner or that has a substantially constant diameter, the rates of the inside diameters of the respective fishline guide rings with respect to rod pipe inside diameters at the corresponding positions are set as 50% or more in the top rod portion and as less than 50% in the middle rod portion, the base rod portion of the rod pipe is formed larger than the middle rod portion, and the fishline guide rings in the base rod portion are formed equal to or larger in thickness than the fishline guide rings in the middle rod portion.

Since the top rod portion of the rod pipe area including the top rod portion has a fine inside diameter, in order to facilitate the insertion of the fishline and reduce the insertion resistance of the fishline when the fishline is cast, the fishline guide ring must be formed thin (because the inside diameter of the top rod portion is very small, the fishline inevitably will touch the water attached to the inner surface of the rod pipe regardless of the thickness of the fishline guide line and, therefore, a fishline guide ring having a small thickness produces substantially the same fishline resistance to the water as a fishline guide ring having a large thickness), and the inside diameter of the fishline guide ring must be set large to thereby obtain an opening rate of 50% or more with respect to the inside diameter of the rod pipe. In the middle rod portion just in the rear of the top rod portion, since the inside diameter thereof is larger than that of the top rod portion, it is easy to secure an opening having a size that makes it easier by the inside diameter difference to insert the fishline in the casting operation. Therefore, even if the opening rate is set to be 50% or less, a sufficient opening can be secured and the thickness of the fishline guide ring can be increased by the reduction of the opening rate. That is, the fishline guide ring can be made in such a manner that the fishline is difficult to contact the water drops attached to the inner surface of the rod pipe. Further, in the base rod portion located in the rear of the middle rod portion, since the inside diameter of the base rod portion is further larger than that of the middle rod portion, in order to prevent the fishline from contacting the water drops stuck to the rod pipe inner surface, the fishline guide ring can be formed larger in thickness than that in the middle rod portion, and the opening rate thereof can be increased over that of the middle rod portion, thereby reducing the insertion resistance of the fishline when it is cast.

The present invention provides a fishing rod with an inserted fishline in which the inner surface of a top rod portion having an inside diameter of 4 mm or less is formed as a flat and smooth surface, no fishline guide ring is provided on the inner surface of the top rod portion except the front and rear portions thereof, the rear end portion of the top rod portion is formed as an enlarged diameter portion which is tapered more steeply than the top rod portion or formed in a stepped portion, the rear end portion of the top rod portion adjoining the enlarged diameter portion has an inside diameter which is forwardly tapered or is almost constant, and on the inner surface of the rear end portion there are provided fishline guide members respectively projecting out inwardly from the inner surface.

According to our experiments, when the inner surface of the rod piper gets wet, if the inside diameter of the rod pipe inner surface is 4 mm or less, then the resistance of the fishline gets smaller when compared with the inside diameter of more than 4 mm. This can be considered as follow: that is, when the inside diameter is small, the water drops are joined together in the rod pipe to produce a bulk state; and, if the fishline passes through the bulk state, then the fishline nearly receives only the viscous resistance of the water. Based on this assumption, in the top rod portion having an inside diameter of the order of 4 mm or less, there is eliminated the need to provide a fishline guide ring which is normally provided in order to avoid contact with the rod pipe inner surface and water drops attached thereto, but the opening rate is set as great as possible to thereby reduce the insertion resistance of the fishline as well as the rod pipe inner surface is formed smooth to thereby reduce the frictional resistance of the fishline to the rod pipe inner surface. In the rear of the top rod portion, there is disposed through an enlarged diameter portion a rod pipe having a large inside diameter and, in the rod pipe having a large inside diameter, in order to prevent the fishline from contacting the water drops attached to the inner surface of the rod pipe, there are provided fishline guide rings which respectively project out inwardly. In this portion, even when the projecting fishline guide rings are provided, there can be obtained a large opening and thus the insertion resistance of the fishline is sufficiently small. Further, the enlarged diameter portion is formed in a tapered or stepped shape to thereby be able to prevent the fishline from touching the water drops as much as possible and thus reduce the resistance of the fishline in this area.

BRIEF DESCRIPTION OF THE DRAWINGS

FIG. 4 is a sectional side view of the main portions of a fourth embodiment of a fishing rod with an inserted fishline according to the invention.

FIG. 5 is a sectional side view of the main portions of a fifth embodiment of a fishing rod with an inserted fishline according to the invention.

DETAILED DESCRIPTION OF THE PREFERRED EMBODIMENTS

Preferred embodiments of the present invention will now be described in detail with reference to the drawings attached hereto.

Figure 1:
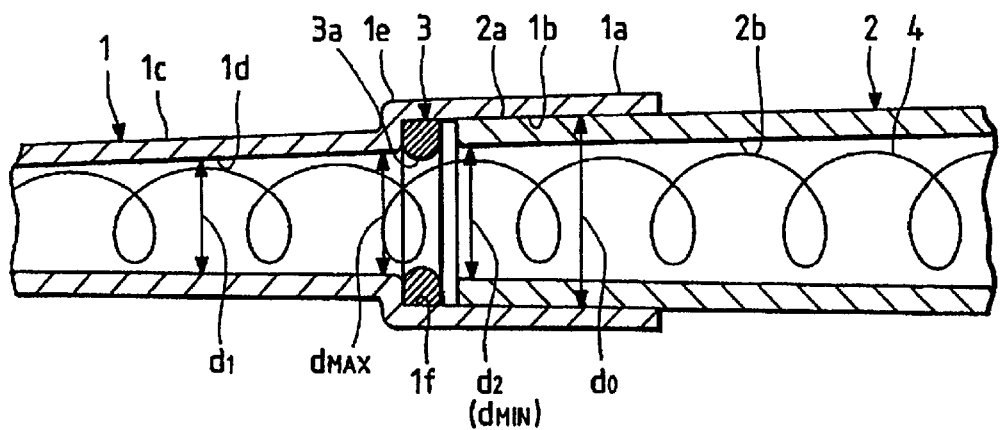
FIG. 1 is a sectional side view of the main portions of a first embodiment of a fishing rod with an inserted fishline according to the invention.

In FIG. 1, there is shown a sectional side view of the main portions of a first embodiment of a fishing rod according to the invention.

In the illustrated fishing rod with an inserted fishline, a plurality of rod pipes are connected to one another and, in FIG. 1, to the inner periphery 1b of the connecting portion 1a of one rod pipe 1 located upstream (tip side), there is removably connected the outer periphery of the connecting portion 2a of the other rod pipe 2 located downstream (butt side), while the inner periphery 1b and the outer periphery are respectively formed in a tapered shape.

And, the inside diameter $d_0$ of the inner periphery 1b of the connecting portion 1a of the one rod pipe 1 is set large, while the inside diameter $d_1$ of the inner periphery 1d of the non-connecting portion 1c thereof is set small.

The inner periphery 1b of the connecting portion 1a and the inner periphery 1d of the non-connecting portion 1c of the one rod pipe 1 are respectively formed in a tapered shape.

Between the connecting portion 1a and non-connecting portion 1c, there is formed a stepped portion 1e.

The inside diameter $d_1$ of the inner periphery Id of the non-connecting portion 1c of the one rod pipe 1 and the inside diameter $d_2$ of the inner periphery 2b of the connecting portion 2a of the other rod pipe 2 are set such that they are approximate to each other. Therefore, the maximum inside diameter $d_{max}$ of the tapered inner periphery id of the non-connecting portion 1c of the one rod pipe 1 is set substantially equal to or greater than the minimum inside diameter $d_{min}$ of the tapered inner periphery 2b of the connecting portion 2a of the other rod pipe 2.

In addition, the inner periphery 1b, the outer periphery 2a and the inner periphery 2b may be formed as non-tapered cylindrical surfaces respectively having constant diameters.

In the inside portion 1f of the stepped portion 1e, there is disposed a fishline guide member 3 formed of ceramics, metal or the like which allows the fishline to slide smoothly and provides a high wear resistance. The fishline guide member 3 is preferably in the form of a ring. The fishline guide members 3 includes an inner periphery 3a which projects radially inwardly beyond both the inside diameter $d_1$ portion of the inner periphery ld of the non-connecting portion 1c of the one rod pipe 1 and the inside diameter portion $d_2$ of the inner periphery 2b of the connecting portion 2a of the other rod pipe 2.

When the present fishing rod with an inserted fishline is used, the outer periphery of the connecting portion 2a of the other rod pipe 2 located downstream is connected to the inner periphery 1b of the connecting portion 1a of the one rod pipe 1 located upstream, and a fishline 4 is inserted through the inner periphery 1d of the non-connecting portion 1c of the one rod pipe 1 located upstream and the inner periphery 2b of the connecting portion 2a of the other rod pipe 2 located downstream, and through the inner periphery 3a of the fishline guide member 3.

When the fishing rod with an inserted fishline is structured in the above-mentioned manner, due to provision of the stepped portion 1e, the inside diameter $d_0$ of the inner periphery 1b of the connecting portion 1a of the one rod pipe 1 is formed large while the inside diameter $d_1$ of the inner. periphery 1d of the non-connection portion 1c thereof is formed small, the inner periphery 2b of the connecting portion 2a of: the other rod pipe 2 located downstream to be connected to the inner periphery 1b of the connecting portion 1a of the one rod pipe 1 can be formed relatively large in diameter, and the inside diameter $d_1$ of the inner periphery 1d of the non-connecting portion 1c of the one rod pipe 1 and the inside diameter $d_2$ of the inner periphery 2b of the connecting portion 2a of the other rod pipe 2 are formed such that they are approximate to each other. Thanks to this, even if the fishline 4 inserted through the inner periphery 1d, inner periphery 2b and inner periphery 3a extends in a spiral manner, there is eliminated the possibility that the fishline 4 can be abutted against the inner peripheries 1d, 2b and 3a to increase the frictional resistance thereof, so that the fishline 4 can be drawn in and out smoothly.

Figure 2:
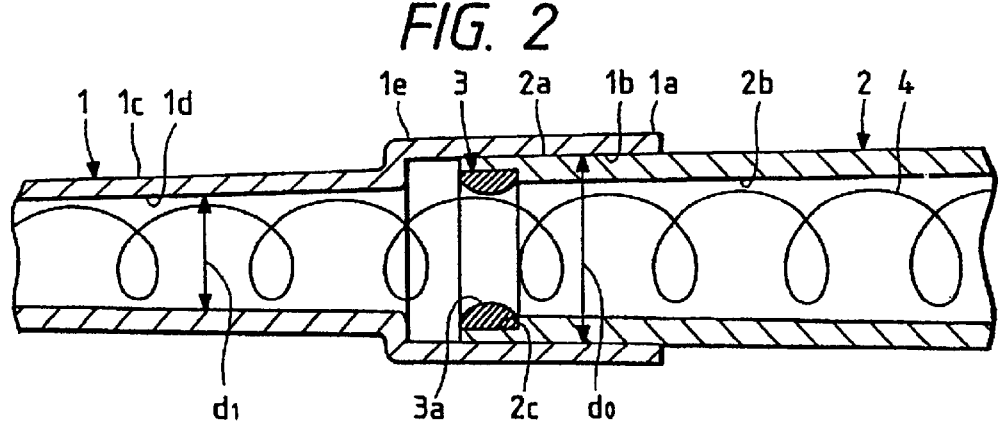
FIG. 2 is a sectional side view of the main portions of a second embodiment of a fishing rod with an inserted fishline according to the invention.

Now, FIG. 2 is a sectional side view of the main portions of a second embodiment of a fishing rod with an inserted fishline according to the invention.

In the second embodiment, in the leading end portion of the inner periphery 2b of the connecting portion 2a of the other rod pipe 2 located downstream, there is formed an annular recessed portion 2c into which the fishline guide member 3 is disposed.

The other remaining portions of the second embodiment are substantially the same as those of the first embodiment.

Figure 3:
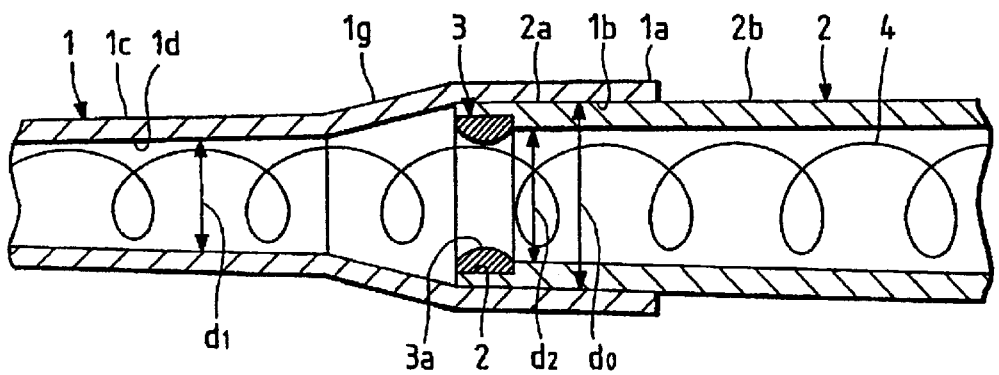
FIG. 3 is a sectional side view of the main portions of a third embodiment of a fishing rod with an inserted fishline according to the invention.

Now, FIG. 3 is a sectional side view of the main portions of a third embodiment of a fishing rod with an inserted fishline according to the invention.

In the third embodiment, the inside diameter $d_0$ of the Ad inner periphery 1b of the connecting portion 1a of the one rod pipe 1 located upstream is formed large, while the inside diameter $d_1$ of the inner periphery 1d of the non-connecting portion 1c thereof is formed small.

Between the connecting portion 1a and non-connecting portion 1c of the one rod pipe 1, there is formed a tapered portion 1g the tapered ratio of which is greater than that of the inside diameter tapered portion of the non-connecting portion 1c. The length of the tapered portion 1g can be set arbitrarily; for example, it can be set long so that the desired flexibility of the fishing rod can be obtained.

The other remaining portions of the third embodiment are substantially the same as those of the second embodiment. Also, the other remaining portions of the third embodiment may be substantially the same as those of the first embodiment.

When the present fishing rod with an inserted fishline is structured as in the above-mentioned third embodiment, due to provision of the tapered portion 1g, the inside diameter $d_0$ of the inner periphery 1b of the connecting portion 1a of the one rod pipe 1 located upstream is set large while the inside diameter $d_1$ of the inner periphery 1d of the non-connecting portion 1c thereof is set small, the inner periphery 2b of the connecting portion 2a of the other rod pipe 2 located down steam to be connected to the inner periphery 1b of the connecting portion 1a of the one rod pipe 1 can be formed relatively large in diameter, and the inside diameter $d_1$ of the inner periphery 1d of the non-connecting portion 1c of the one rod pipe 1 and the inside diameter 2 of the inner periphery 2b of the connecting portion 2a of the other rod pipe 2 located downstream are formed such that they are approximate to each other. Therefore, even if the fishline 4 inserted through the inner peripheries 1d, 2b and 3a extends therethrough in a spiral manner, there is eliminated the possibility that the fishline 4 can be abutted against the respective inner peripheries 1d, 2b and 3a to increase the frictional resistance thereof, thereby making it possible to draw the fishline 4 into and out of the rod pipe smoothly.

Now, FIG. 4 is a sectional side view of the main portions of a fourth embodiment of a fishing rod with an inserted fishline according to the invention.

In the fourth embodiment, to the inner periphery 1b of the connecting portion 1a of the one rod pipe located upstream, there is removably connected the outer periphery of the front connecting portion 5a of the other rod pipe 5 located downstream, while the inner periphery 1b of the one rod pipe 1 and the outer periphery of the other rod pipe 5 are respectively formed in a tapered shape.

To the outer periphery of the rear connecting portion 5b of the other rod pipe 5 located downstream, there is integrally connected and fixed the inner periphery 6b of the connecting portion 6a of another rod pipe 6.

The one rod pipe 1 is structured such that the inside diameter $d_0$ of the inner periphery 1b of the connecting portion 1a thereof is set large while the inside diameter $d_1$ of the inner periphery 1d of the non-connecting portion 1c thereof is set small.

The inner periphery 1b of the connecting portion 1a and the inner periphery 1d of the non-connecting portion 1c of the one rod pipe 1 located upstream are respectively formed in a tapered shape.

Between the connecting portion 1a and non-connecting portion 1c, there is formed a tapered portion 1g the tapered ratio of which is greater than that of the inside diameter tapered portion of the non-connecting portion 1c.

Also, between the connecting portion 6a and non-connecting portion 6c of the rod pipe 6, there is formed a tapered portion 6d.

The non-connecting portion 6c is formed in a tapered shape, and the tapered portion 6d is formed in a forwardly broadening tapered shape the tapered ratio of which is greater Ithan that of the inside diameter tapered portion of the non-connecting portion 6c.

The inside diameter $d_1$ of the inner periphery 1d of the non-connecting portion 1c of the one rod pipe 1 located is1 upstream, the inside diameter $d_3$ of the inner periphery 5c of the rod pipe 5 located downstream, and the inside diameter $d_4$ of the inner periphery 6e of the non-connecting portion 6c of the rod pipe 6 are formed such that they are approximate to one another. Therefore, the maximum inside diameter $d_{max}$ of the inner periphery 1d of the non-connecting portion 1c of the one rod pipe 1 is set substantially equal to or greater than the minimum inside diameter da of the inner periphery 5c of the rod pipe 5.

In the front and rear end portions of the inner periphery 5 of the other rod pipe 5 located downstream, there are formed recessed portions 5d, 5e into which the fishline guide members 3, 3 are disposed. And, the inner peripheries 3a of the fishline guide members 3 each project out radially inwardly beyond the inside diameter $d_1$ portion of the inner periphery 1d of the non-connecting portion 1c of the one rod pipe 1, the inside diameter $d_3$ portion of the inner periphery 5c of the other rod pipe 5 and the inside diameter $d_4$ portion of the inner periphery 6c of the non-connecting portion 6c of the rod pipe 6.

Now, FIG. 5 is a sectional side view of the main portions of a fifth embodiment of a fishing rod with an inserted fishline according to the invention.

In the fifth embodiment, the connecting relationship provided in the fourth embodiment is reversed.

That is, the outer periphery of the front connecting portion $5f$ of the other rod pipe 5 is integrally connected and fixed to the inner periphery $1i$ of the connecting portion $1h$ of the rod pipe 1 located upstream, and the inner periphery $6g$ of the connecting portio $6f$ of the one rod pipe 6 located downstream is removably connected to the outer periphery of the rear connecting portion $5g$ of the other rod pipe 5, while the outer periphery of the other rod pipe 5 and the inner periphery $6g$ of the one rod pipe 6 are respectively formed in a tapered shape.

The one rod pipe 6 located downstream is structured such that the inside diameter $d_5$ of the inner periphery $6g$ of the connecting portion $6f$ thereof is formed large and the inside diameter $d_4$ of the inner periphery $6e$ of the non-connecting portion $6c$ thereof is formed small. In this embodiment, the minimum inside diameter $d_4$ of the inner periphery $6e$ of the non-connecting portion $6c$ of the one rod pipe 6 is set substantially equal to the minimum inside diameter $d_{min5}$ of the inner periphery $5c$ of the rod pipe 5 whereas the maximum inner diameter $d_{max5}$ of the inner periphery $5c$ of the rod pipe 5 is set substantially equal to the maximum inner diameter $d_{max}$ of the inner periphery $1d$ of the rod pipe 1.

The other remaining portions of the fifth embodiment are substantially the same as those employed in the fourth embodiment.

To manufacture each of the rod pipes 1, 2, 5 and 6, after a tape-like prepreg sheet (not shown) cut to a rectangular shape is wound round a metal core (not shown) a proper number of times, tape is applied onto the outside of the prepreg wound round the metal core, and they are put into a heating furnace and are formed into an integrated member according to an ordinary method, that is, according to a thermally hardening process.

The prepreg sheet can be formed by impregnating woven, cloth, which is reinforced with high-strength fiber such as carbon fiber, glass fiber, aramide fiber, alumina fiber, Kevlar fiber, and other organic fiber and inorganic fiber, with thermosetting synthetic resin such as epoxy resin, phenol resin, polyester resin and the like.

Since the first to fifth embodiments of the present invention is structured in the above-mentioned manner, due to provision of the tapered portion or stepped portion, the inside diameter of the inner periphery of the connecting portion of one rod pipe is formed large while the inside diameter of the inner periphery of the non-connecting portion thereof is formed small, the inner periphery of the connecting portion of the other rod pipe to be connected to the inner periphery of the connecting portion of the one rod pipe can be formed relatively large, and the inside diameter of the inner periphery of the non-connecting portion of the one rod pipe and the inside diameter of the inner periphery of the connecting portion of the other rod pipe are formed such that they are approximate to each other. Thanks to this, even if a fishline inserted through the respective inner peripheries extends therethrough in a spiral manner, there is eliminated the possibility that the fishline can be abutted against the respective inner peripheries to increase the frictional resistance thereof, so that the fishline can be drawn into or out of the rod pipe smoothly. That is, the present invention can provide a fishing rod with an inserted fishline which provides practically excellent effects.

Figure 6:
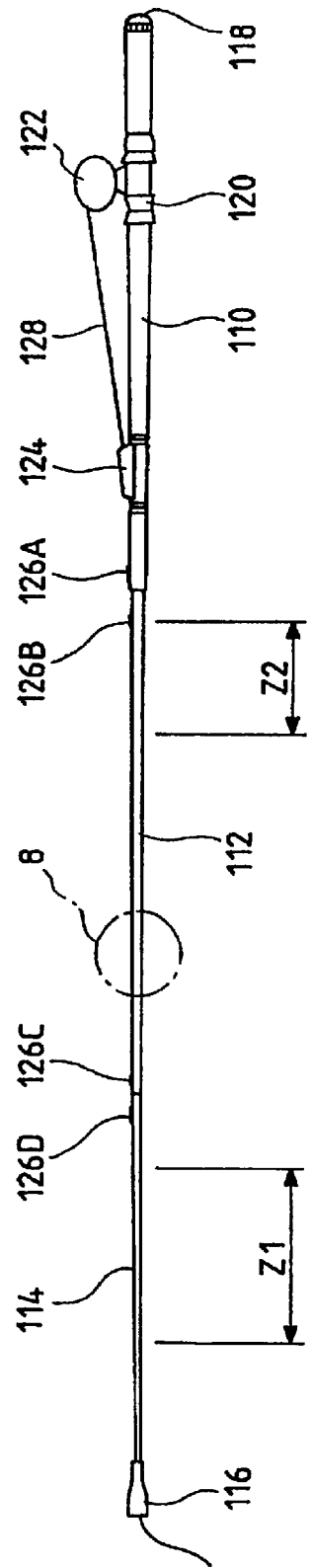
FIG. 6 is a side view of a sixth embodiment of a fishing rod with an inserted fishline according to the invention.

FIG. 6 is a side view of a sixth embodiment of a fishing rod with an inserted fishline according to the invention. In the present fishing rod with an inserted fishline, a middle rod pipe 112 is connected to a base rod pipe 110, a top rod pipe 114 is connected to the middle rod pipe 112, and a top guide 116 is mounted on the leading end portion of the top rod pipe 114. In this case, the mark 126A of the base rod pipe 110 is matched to the mark 126B of the middle rod pipe 112 and the mark 126C of the middle rod pipe 114 is matched to the mark 126D of the top rod pipe 114, whereby the respective rod pipes can be connected in such a manner that the vertical directions of the respective rod pipes can be set as specified.

A reel seat 120 is mounted on the rear portion of the base rod pipe 110 and a reel 122 is mounted on the reel seat 120. Also, in the front portion of the base rod pipe 110 there is provided a fishline introduction guide 124 which guides a fishline 128 from the reel 122 into the rod pipes and draws it out externally again. Reference character 118 designates a tail part. The rod pipes 110, 112 and 114 are respectively formed by impregnating or mixing reinforcing fiber such as carbon fiber or the like with thermosetting resin or thermoplastic resin and then by pressurizing and heating the same.

Figure 8:
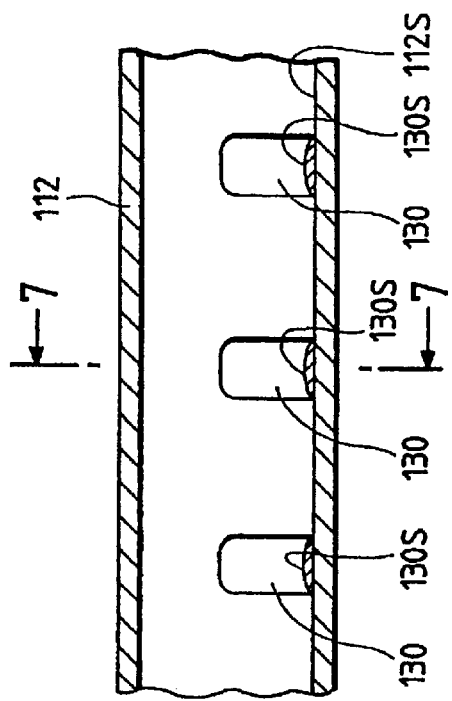
FIG. 8 is an enlarged longitudinal section view of the portion 8 in FIG. 6.
Figure 7:
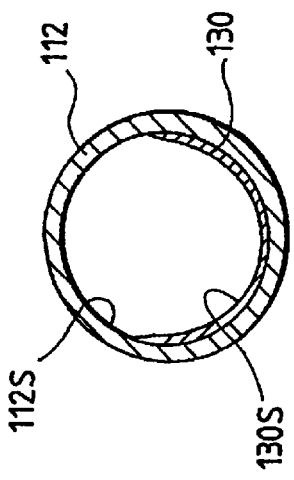
FIG. 7 is a transverse section view of a portion 8 shown in FIG. 6, taken along the arrow line 7—7 in FIG. 8.

On the inner surfaces of the rod pipes that are situated in the ordinary positions upstream of the fishline introduction guide 124 of the fishing rod, for example, as shown in FIG. 8 which is an enlarged longitudinal section view of the fishing rod taken at a position 8, a plurality of fishline guide members 130 are disposed at suitable distances from one another. Also, a transverse section view of the fishing rod taken along the arrow line 7—7 is shown in FIG. 7. In FIG. 7, the fishline guide member 130 is formed in the lower area of the inner surface 112S of the middle rod pipe 112. The top rod pipe 114 is also structured similarly to this. Thus, the water drops that have penetrated into the respective rod pipes are caused to fall down into the lower portions of the inner surfaces of the rod pipes (such as the lower portion of the inner surface 112S and the like) which are lower in position than the surfaces 130S of the respective fishline guide members 130. For this reason, when the fishline 128 is played out, the fishline 128 can be scarcely abutted against the lower portions of the inner surfaces of the rod pipes, which eliminates the possibility that the water drops can be in touch with the fishline 128 to thereby increase the fishline resistance. Also, since the upper portions of the fishline guide members 130 are not necessary in preventing the water drops from contacting the fishline, only the lower portions of the fishline guide members 130 may be formed in such a manner that they form a semi-annular shape. This increases the insertion area of the fishline 128 when it is played out by an amount corresponding to the omitted upper portions of the fishline guide members, thereby being able to reduce the fishline resistance accordingly.

The fishline guide member 130 may be formed of fluorocarbon resin, silicone resin or the like so that the surface 130S thereof can be so formed as to have water repellency as well as small frictional resistance. However, alternatively, in view of the fact that, when the fishline 128 is taken up round the reel 122, the fishline 128 is drawn while it is rubbed against the lower portions or areas of the respective rod pipes 112 and 114, the fishline guide member 130 may be formed of hard ceramics so that it is difficult to be damaged.

Figure 9:
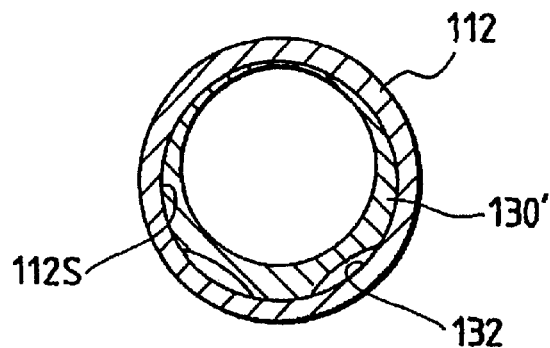
FIG. 9 is a transverse section view of a modification of a fishline guide member employed in the above embodiment, corresponding to FIG. 7.

Now, FIG. 9 is a transverse section view of a modification of the fishline guide member, which corresponds to FIG. 7. The modified fishline guide member 130' is in close contact with the inner surface 112S of the rod pipe 112 and consists of a ring-shaped member which includes a thin upper portion and a thick lower portion. In view of the fact that, when the fishline 128 is played out, the larger the fishline passage hole, the smaller the fishline resistance, the upper portion of the guide member 130' is formed thin. On the other hand, as described above, when the fishline 128 is taken up, since the fishline is drawn in while being rubbed against the lower portion of the guide member 130' and thus the lower portion of the guide member 130' can be easily worn, the lower portion of the guide member 130' is formed thicker than the upper portion thereof.

Also, because the water drops that have penetrated into the rod pipe collect in the lower portion of the rod pipe inner surface 112S, there is formed a water drain hole 132 between the. lower surface of the lower portion of the fishline guide member 130' and the inner surface 112S of the rod pipe 112. Due to the existence of the water drain hole 132, the water can be guided to the leading end portion of the fishing rod and can be made to fall down, for example, from the top guide 116. Of course, the water drain hole can also be opened up at a suitable position of the rod pipe and the water can be drained therefrom.

Figure 10:
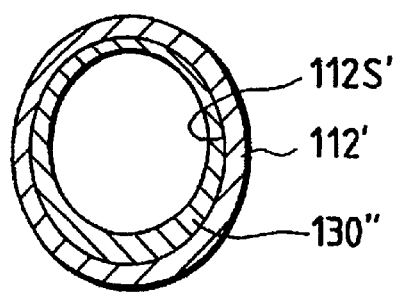
FIG. 10 is a transverse section view of another modification of a fishline guide member employed in the above embodiment, corresponding to FIG. 7.

Now, FIG. 10 shows a transverse section view of a further modification of the fishline guide member, in which a fishline guide member 130' is formed on the inner surface 112S' of the rod pipe 112' having an oval cross-section. Similarly to FIGS. 7 and 9, the fishline guide member 130' is thin in the upper portion thereof and thick in the lower portion thereof and is in close contact with the inner surface 112S'. The existence of the thick lower portion of the fishline guide member 130" shifts the fishline insertion area upwardly and, for this reason, when the fishline is played out, the fishline is prevented from getting wet because the fishline is kept away from the water drops that have penetrated into the rod pipe. Also, since not the whole but part of the fishline can be in contact with the inner surface of the rod pipe, only small friction can be produced between the fishline and rod pipe inner surface. Further, when the fishline is taken up, it is drawn in while it is rubbed against the lower portion of the fishline guide member 130" but, however, because the lower portion of the fishline guide member 130" is formed thick, it can stand long use although it is worn.

Referring back again to FIG. 6, an area Z1 of the top rod pipe 114 is an area which can be flexed greatly due to the weight of the terminal tackle of the fishing rod when a fishing rod operation is performed before fish is caught. On the other hand, a rear area Z2 of the middle rod pipe 112 is an area which can be flexed greatly when fish is caught. These lower areas respectively produce a larger contact force with the fishline 128 than the other areas of the rod pipe and, therefore, in these lower areas, the inner surface of the rod pipe can easily damaged and worn and the fishline 128 can also be easily cut by such damaged portions.

Therefore, if the fishline guide members respectively formed of wear-resisting hard material such as ceramics or the like are provided successively in the longitudinal direction in these areas while no fishline guide member is provided in the other remaining areas, then a light fishing rod can be supplied; the inner surfaces of the rod pipes of the fishing rod are prevented from being damaged, and the existence of the fishline guide members prevents somewhat the fishline from being wet when it is played out. Also, if the fishline guide members are disposed in the areas Z1 and Z2 successively in the longitudinal direction at relatively short intervals as mentioned above and, in the other areas than the two areas Z1 and Z2, a plurality of fishline guide members are disposed at relatively long intervals, then the damage of the rod pipe inner surface as well as the cutting of the fishline can be prevented in the fishline take-up operation and, in the fishline play out operation, the wetting of the fishline can be prevented. In the above embodiment, each of the fishline guide member can take any of the transverse sections which are shown in FIGS. 7, 9 and 10.

Figure 11:
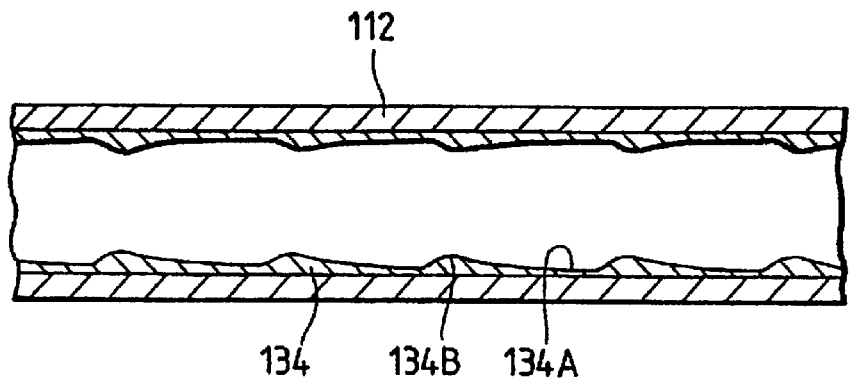
FIG. 11 is a partially longitudinal section view of a seventh embodiment of a fishing rod with an inserted fishline according to the invention.

Next, FIG. 11 is a partially longitudinal section view of a seventh embodiment of a fishing rod with an inserted fishline according to the invention, in which the longitudinal section of the middle rod pipe. 112 is typically shown. The right side of FIG. 11 is the base rod side. and the left side thereof is the top rod side. A thin layer 134 is provided on the inner surface of the rod pipe 112 in such a manner that: recessed portion 134A and projected portions 134B are formed on the surface of the thin layer 134. As shown in FIG. 11, the recessed and projected portions include no angular corner portions between them but are formed smoothly in such a manner that they are connected to each other smoothly through a gently upward slope extending toward the top rod side.

In the present embodiment, the water drops that have penetrated into the rod pipes are caused to fall down into the recessed portions 134A and, therefore, the projected portions 134B are prevented from getting wet. When the fishline 128 is; played out, the fishline 128 can be in touch with the projected portions 134B but not in touch with the recessed portions 134A. This prevents the fishline 128 from getting wet and also can reduce the resistance of the fishline. Also, since the recessed and projected portions are connected with each other with the slope gently inclined upwardly toward the top rod side, they provide little resistance to the fishline when the fishline is played out. The thin layer 134 including such recessed and projected portions may be disposed along the whole periphery of the inner surfaces of the rod pipes or may be disposed only in the lower areas thereof.

The thin layer 134 is preferably formed by using the following process: An elastic core having recesses and projections is fitted on a metal core and then a sheet-like or tape-like prepreg is wound on the outer periphery of the elastic core to form an innermost layer, i.e. the thin layer 134 of the rod pipe 112.

Figure 12:
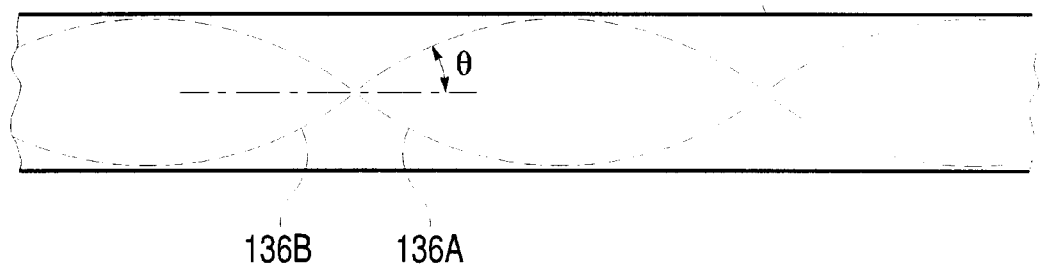
FIG. 12 is a partially longitudinal section view of an eighth embodiment of a fishing rod with an inserted fishline according to the invention.

Now, FIG. 12 is a partial section view of an eighth embodiment of a fishing rod with an inserted fishline according to the invention. In FIG. 12, there is shown a fishing rod with an inserted fishline in which two spirally-arranged projecting stripes 136A and 136B each having an angle θ of less than ±45° with respect to the axis of the rod pipe 112 are formed on the inner surface of the rod pipe 112. If the angle θ is close to ±45°, then a small pitch is obtained and thus even a single spirally projecting stripe can prevent the fishline 128 from coming into contact with the rod pipe inner surface when the fishline 128 is inserted into the rod pipe. On the other hand, if the angle θ is small, then the pitch becomes large and thus a single stripe is not able to prevent the contact of the fishline 128 with the rod pipe inner surface and, therefore, two stripes are formed. Three or more stripes can be formed.

It is preferable that there are formed a plurality of spirally-arranged projecting strips each directed at an angle ranging from ±15° to −15° with respect to the longitudinal direction of the rod pipe 112 in order to more effectively reduce the friction of the fishing line and discharge the penetrated water. The strips may be oriented in the same direction, i.e clockwise or counterclockwise, or in different directions with respect to the axis of the rod pipes 112, but it is preferable that they are arranged in the same direction. In addition, circumferential width of the projecting strip may be widened so that a narrow spirally-arranged groove remains on the inner periphery of the rod pipe 112.

If the spirally-arranged projecting stripes are formed on the inner surface of the rod pipe in this manner, then the water drops that have penetrated into the rod pipe 112 are caused to flow through the rod pipe inner surface along the spirally projecting stripes according to the fishing rod operation. Due to this, the water drops can be flown out from the top guide 116 and the water drops can also be discharged out externally from a water drain hole formed at a suitable position of the rod pipe 112 and the like. This prevents the fishline from getting wet and thus can reduce the fishline resistance when the fishline is played out. Also, provision of the spirally projecting stripes allows the fishline guide portions to appear on the inner surface of the rod pipe at a given pitch. Since the fishline 128 is supported by these fishline guide portions, the fishline resistance can be reduced further.

In addition, the spirally-arranged projecting strip may be formed entirely on the inner periphery of the rod pipe 112 along the longitude thereof, or may be partially formed on the inner periphery of the rod pipe 112 at locations where the fishline is likely to be contacted with the inner periphery of the rod pipe 112.

Figure 13:
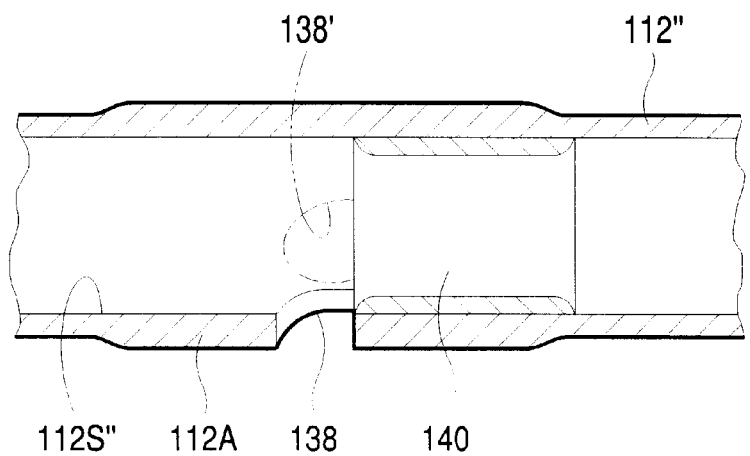
FIG. 13 is a partially longitudinal section view of a ninth embodiment of a fishing rod with an inserted fishline according to the invention.

Now, FIG. 13 is a partially longitudinal section view of a ninth embodiment of a fishing rod with an inserted fishline according to the invention. In the present embodiment, for example, a fishline guide member 140 is disposed on the inner surface 112S" of the middle rod pipe 112" and, on the top rod side and in the neighborhood of the fishline guide member 140, there is formed a discharge hole 138 from which the water drops penetrated into the rod pipe 112" can be discharged externally of the rod pipe 112". The water drops that have penetrated into the rod pipe 112" are not stable on the surface of the fishline guide member 140 and, therefore, collect in the lower portion of the inner surface 112S" of the middle rod pipe 112". In order that the water drops are prevented from flowing toward the angler but can be discharged in the middle portion of the rod pipe, the discharge hole 138 can be formed in the lower portion of the rod pipe 112" and in front of the fishline guide member 140. That is, in this structure, when the fishing rod is raised somewhat, the water that is dammed up in front of the fishline guide member 140 can be discharged out externally from the discharge hole 138. This prevents the fishline from getting wet and thus can reduce the resistance of the fishline. In FIG. 8, reference numeral 112A designates a reinforcing portion of the rod pipe 112" and the reinforming portion 112A makes up for the lowered strength of the rod pipe 112" due to the existence of the discharge hole 138.

A plurality of such fishline guide members 140 are disposed in the longitudinal direction of the rod pipe and, correspondingly to the fishline guide members 140, there are formed discharge holes 138, 138' in such a manner that they are respectively shifted in position in the rod pipe from one another in the circumferential direction of the rod pipe, so that, even if the position of the lower portion of the rod pipe is changed in the fishing rod operation, the water can be discharged by means of any of the discharge holes. Further, the position of the discharge hole 138 is not limited to the front side of the fishline guide member 140 but it may be formed in the rear of the fishline guide member 140. However, if the discharge hole 138 is formed in the rear of the fishline guide member 140, then there is a possibility that the water can flow toward the angler and the water can be discharged when the fishing rod is inclined forwardly.

The above-mentioned fishline guide member, thin coating layer and spirally-arranged projecting stripe may be formed of fluorocarbon resin or silicone resin if importance is put on water repellency and low friction. On the other hand, if importance is attached to wear resistance, then they may be formed of ceramics or hard resin. Also, they can be formed by winding or coating the material in a sheet-like or tape-like shape and then applying the same into the inner periphery of the rod pipe integrally therewith, or by coating onto the rod pipe inner periphery a mixture which is obtained by mixing epoxy resin or the like with fluorocarbon fine particles, molybdenum fine particles, silicone fine particles or the like.

In particular, a mold releasing agent is coated onto a metal core and, after then, fluorocarbon resin paint or the like coated on the mold releasing agent, or tape or sheet formed of fluorocarbon resin is wound round the metal core. In the case of the coating, the coated agent and paint are allowed to dry by themselves naturally- After then, a fiber reinforced prepreg impregnated or mixed with thermosetting resin or thermoplastic resin forming the rod pipe is wound round the thus treated material and, after then, these materials are pressurized and heated, that is, they are treated into an integral member according to an ordinary treating method.

As can be seen clearly from the foregoing description, according to one aspect of the invention, existence of the lower portion of the fishline guide member causes the water drops to collect on the inner surface of the rod pipe and thus the surface of the fishline guide member is kept not wet. For this reason, when the fishline is played out, the fishline is prevented from getting wet and thus the resistance of the fishline can be kept small. Also, since the upper portion of the fishline guide member can be omitted or can be forme thin, the insertion area of the fishline can be increased as much as possible, thereby reducing the fishline resistance.

According to another aspect of the invention, there are provided recessed and projected portions on the surface of a film layer disposed on the inner surface of the rod pipe, and the recessed and projected portions are formed smoothly in such a manner that they are gently inclined from the base portion of the fishing rod toward the leading end portion thereof. Due to this, the water drops are caused to collect in the recessed portions; which in turn prevents the fishline from getting wet when it is played out and, at the same time, can reduce the fishline resistance without interfering with the insertion of the fishline.

According to still another aspect of the invention, since there are provided one or more spirally projecting stripes each having an angle of less than 45° with respect to the axis of the rod pipe, the water drops can be discharged out along the spirally projecting stripes from the top guide or the like and also the fishline can be supported by the spirally projecting stripes. This can reduced the resistance of the fishline when the fishline is played out.

According to yet another aspect of the invention, because in the neighborhood of the fishline guide member disposed on the inner surface of the rod pipe there is formed a discharge hole which is used to discharge the water drops externally of the rod pipe, the water that is dammed up by the fishline guide member can be discharged out through the discharge hole and also the fishline can be received by the fishline guide member. Thanks to this, when the fishline is played out, the fishline is prevented from getting wet and thus the resistance of the fishline can be reduced accordingly.

Figure 14:
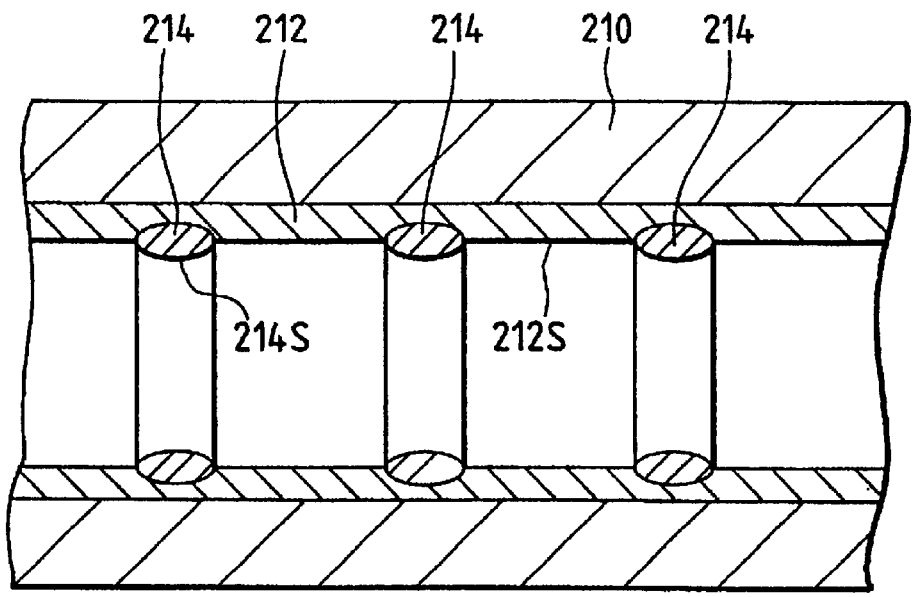
FIG. 14 is a longitudinal section view of a tenth embodiment of a fishing rod with an inserted fishline according to the invention.

FIG. 14 shows a tenth embodiment of a fishing rod according to the invention. In the tenth embodiment, a fiber reinforced prepreg (the term is used in a broad sense including thermoplastic resin) is prepared by impregnating high-strength fiber such as carbon or the like with thermosetting resin such as epoxy resin or the like or by mixing the high-strength fiber with thermoplastic resin such as polyamide or the like, and the fiber reinforced prepreg is then wound round a core member (metal core) and burned together to thereby produce a rod pipe main body layer 210. A thin layer 212 having a thickness smaller than the rod pipe main body layer 210 is formed on the inner periphery of the rod pipe main body 210. The inner peripheral surface 212S of the thin layer 212 has a water repellent property.

The thin layer 212 may be formed of only the water repellent material such as fluorocarbon resin, silicone resin, Teflon resin, wax or the like, or may be formed by mixing epoxy resin with water repellent material of 10 microns or less such as fluorine fine particles, silicone fine particles or the like, or may be formed by coating water repellent material onto the surface of a film which is used to improve the contact with the inner peripheral surface of the rod pipe main body layer 210. The thickness of the thin layer 212 may be 500 microns or less, preferably, may be 20 to 200 microns.

Two or more wear resisting annular fishline guide members 214 are disposed at suitable distances from one another in the longitudinal direction of the thin layer 212 in such a manner that the guide members 214 respectively project out inwardly from the water repellent surface 212S of the thin layer 212. This prevents the surface 212S of the thin layer 212 from being worn and damaged when the fishline is inserted into the base portion of the rod pipe and is drawn out of the leading end portion of the rod pipe and vice versa, so that the thin layer surface 212S can keep its water repellency for a long period of time. The fishline guide member 214 can be formed of ceramics, metal, or composite material having a glassy surface, or can be formed by evaporizing ceramics or metal on the surface of another material. This can also reduce the resistance of the fishline.

Further, the cross section of the fishline guide member may be circular or flat. And, if the using direction (upward or downward direction) of the fishing rod is fixed, then the annular shape of the fishline guide member 214 may not be a complete circle but a semi-circle consisting of, for example, a lower half section of a complete circle.

In the tenth embodiment, as described above, although the water repellent surface 212S of the thin layer 212 can be maintained for a long period of time, in fact, it is worn but gradually. In this case, even if wax or the like is coated on the inner periphery of the rod pipe as the repairs on the rod pipe, generally, the wax or the like can be removed in the early time because the distances between the respective fishline guide members 214 are long.

Figure 15:
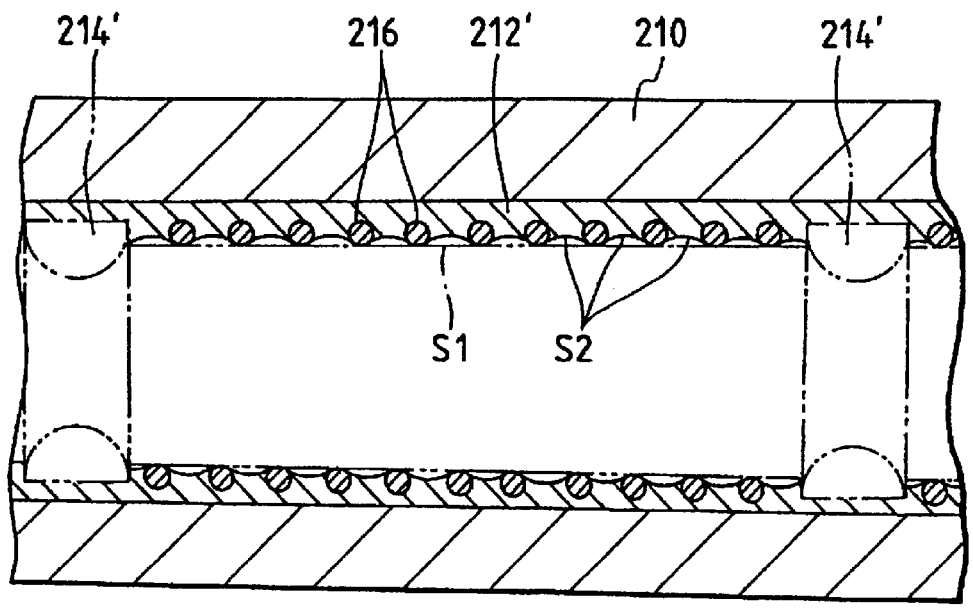
FIG. 15 is a longitudinal section view of a eleventh embodiment of a fishing rod with an inserted fishline according to the invention.

In view of the above fact, in FIG. 15, there is shown an eleventh embodiment of a fishing rod with an inserted fishline-according to the invention in consideration of the repairs thereof. In the eleventh embodiment, a thin layer 212' having a water repellent surface Si is formed on the inner periphery of a rod pipe main body layer 210, and the surface of the thin layer 212' is formed in a mixed state which includes a wear resisting high-strength member 216 and a water repellent portion. The wear resisting high-strength member 216 may be formed of a similar material to the above-mentioned guide member 214, or may be formed by hardening globular ceramics particles, or may be formed of high-strength fiber. In the latter case, the high-strength fiber is knitted into a woven cloth or into a bag net before it is actually used. Also, the other portions of the thin layer 212' than the high-strength member 216 can be formed of a similar material to the above-mentioned thin layer 212.

In this manner, since the surface of the thin layer 212' consists of a mixture of the wear resisting high-strength member 216 and water repellent portion, even if the fishline runs while it is inserted into the rod pipe, the fishline is received mainly by the high-strength member 216 and, therefore, the water repellent portion of the thin layer is protected against wear. However, if the water repellent portion is used for a long time, then it is worn gradually to provide minute recessed surfaces S2. When the water repellent portion loses or reduces its water repellent effect in this manner, then it can be repaired with wax or the like.

Since the wax is applied to the surfaces of minute recesses and projections, unlike the above-mentioned tenth embodiment, the wax is easy to stay there. Due to this, even after the water repellent portion is worn, if it is repaired with the wax, then the fishline can be smoothly guided again and the water repellency can be maintained. In this manner, the water repellent layer on the inner periphery of the rod pipe can be repaired repeatedly.

Although not essential to the present embodiment, if annular fishline guide members respectively shown by two-dot chained lines are disposed at suitable distances from one another in the longitudinal direction of the rod pipe, then the wear of the water repellent portion can be further reduced similarly to the tenth embodiment. In the tenth and eleventh embodiments, if the thin layers 212, 212' are formed of a soft material or a material having resiliency with respect to the rod pipe main body layer 210, then the damping actions thereof prevent them from being broken. Also, both of the tenth and eleventh embodiments have little influence on the flexing property of the rod pipe.

Besides the rod pipes employed in the tenth and eleventh embodiments, even in the case of a rod in which only the thin layer having a water repellent property is formed on the inner periphery of the rod pipe main body layer 210, if a fishline to be inserted into the rod pipe is provided with a water repellent property on the surface thereof and is formed of net threads of polyethylene fiber, then the fishline is softer than the water repellent surface of the thin layer on the inner periphery of the rod pipe. That is, the net threads provide a soft surface which is easy to curve and deform, which makes it difficult for the water repellent surface of the inner periphery of the rod pipe to be worn or damaged. Also, since the surface of the fishline is provided with a water repellent property, it is difficult for the water drops to stick to the fishline and thus to penetrate into the rod pipe. Further, even if the water drops happen to penetrate into the rod pipe, the water drops can be easily removed in cooperation with the water repellent surface of the inner periphery of the rod pipe during the draw-in and draw-out operations of the fishline.

Also, since the fishline is formed of net threads of polyethylene fiber, the fishline is hard to melt and to be damaged even when heat is generated due to frictional resistance between the rod pipe and the fishline. Also, it is difficult for the fishline to be charged with electricity, thereby preventing attachment of dust thereto.

Now, description will be given below of a method of manufacturing the rod pipe employed in the tenth embodiment with reference to FIGS. 16(a), 16(b) and 16(c).

Figure 16A:
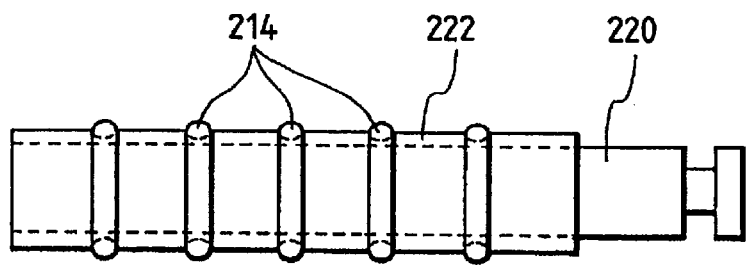
FIGS. 16(a), 16(b) and 16(c) are explanatory views of a method of manufacturing a fishing rod according to the tenth embodiment of the invention.

At first, a receive member layer 222 formed of an elastic member such as a silicone tube or a clay-like member is put on a mandrel 220, and there is inserted on the outside of the receive member layer 222 a plurality of annular guide rings 214 each-having such a size as can tighten the receive member layer 222 as shown in FIG. 16(a).

Figure 16B:
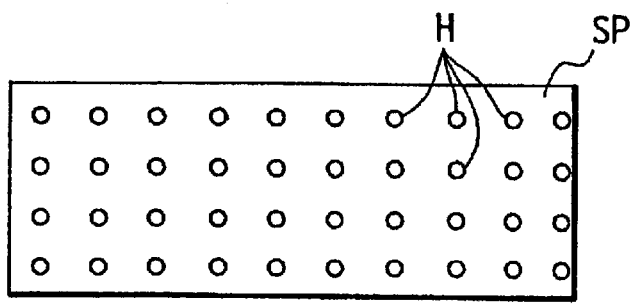

Next, for example, there is wound round the above a film shown in FIG. 16(b) which is formed of a fluorocarbon resin film SP including a large number of small holes H.

Figure 16C:
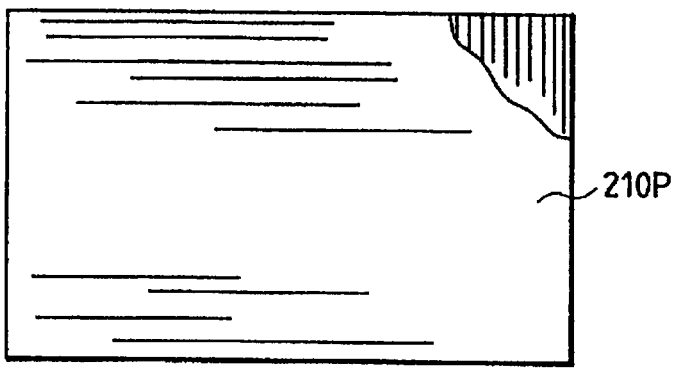

Then, a fiber reinforced prepreg 210P shown in FIG. 16(c) is wound round the film a required number of times.

After than, a tightening tape or the like is wound round the above assembly and is heated and burned while it is pressurized. Then, the burnt assembly is cooled and, after then, the tightening tape and mandrel 220 are removed from the assembly and further the receive member layer 222 is removed from inside.

In this manner, the fluorocarbon resin film SP turns into the thin layer 212, while the fiber reinforced prepreg 210P turns into the rod pipe main body layer 210. In the thus formed rod pipe, the annular guide members 214 project out inwardly from the inner periphery thereof, and the resin of the fiber reinforced prepreg 210P flows into the small holes H in the film to thereby facilitate the integration of the thin layer 212 and rod pipe main body layer 210. The film SP may be formed in a sheet shape or in a tape shape. Also, the film winding process (FIG. 16(b)) may be omitted, instead, after the annular fishline guide members 214 are integrally formed with the rod pipe main body layer 210, water repellent resin may be coated onto the inner periphery of the rod pipe.

A method of manufacturing the rod pipe according to the eleventh embodiment is basically similar to the above-mentioned method. However, in the case of the thin layer 212', if a woven member or a bag net member formed of wear resisting high-strength fiber is firstly wound and a sheet or a tape formed of a water repellent member is wound round the woven member, then a mixture of a high-strength member and a water repellent portion can be produced on the inner peripheral surface of the rod pipe.

As can be clearly seen from the foregoing description, according to the invention, since the fishline is guided by the wear resisting annular fishline guide members, the fishline does not come into strong contact with the water repellent surface of the inner periphery of the rod pipe. This prevents the damaged and/or grooved surface due to wear, can maintain the water repellency of the rod pipe inner periphery for a long period of time, and makes it possible to draw in and out the fishline smoothly.

Also, if the surface of the thin layer is formed of a mixture of a high-strength member and a water repellent portion, the water repellent surface can be maintained for a long period of time and also the fishline can be drawn in and out smoothly. Also, even when the surface is worn, it provides minute recesses and projections and, therefore, they can be repaired with wax or the like, that is, the water repellent surface stands long use.

Further, if the fishline is provided with a water repellent property, it is difficult for the water drops to penetrate into the rod pipe but it is easy to draw in and out the fishline smoothly. Also, if the fishline is formed of net threads, the fishline is soft. Due to this, the water repellent surface of the inner periphery of the rod pipe is difficult to be damaged and thus the water repellent surface can be maintained for a long period of time. In addition, the fishline can be drawn in and out smoothly.

Figure 17:
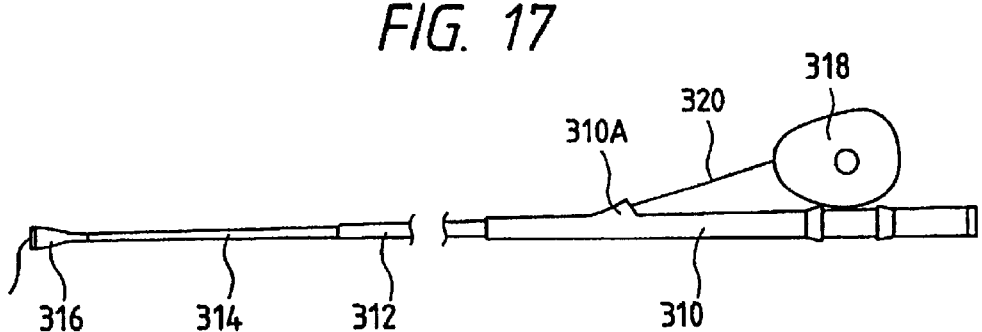
FIG. 17 is a side view of a twelfth embodiment of a, fishing rod with an inserted fishline using fishline guide rings according to the invention.

FIG. 17 is a side view of a twelfth embodiment of a fishing rod with an inserted fishline according to the invention, in which a middle rod 312 is connected to a base rod 310 and a top rod 314 is connected to the middle rod 312. A fishline 320, which is played out from a reel 318 mounted on a reel fixing device, is inserted through a fishline insertion guide member 310A into the inside of the rod pipe and is drawn out externally through a top guide member 316 located at the leading end of the rod pipe.

Figure 18:
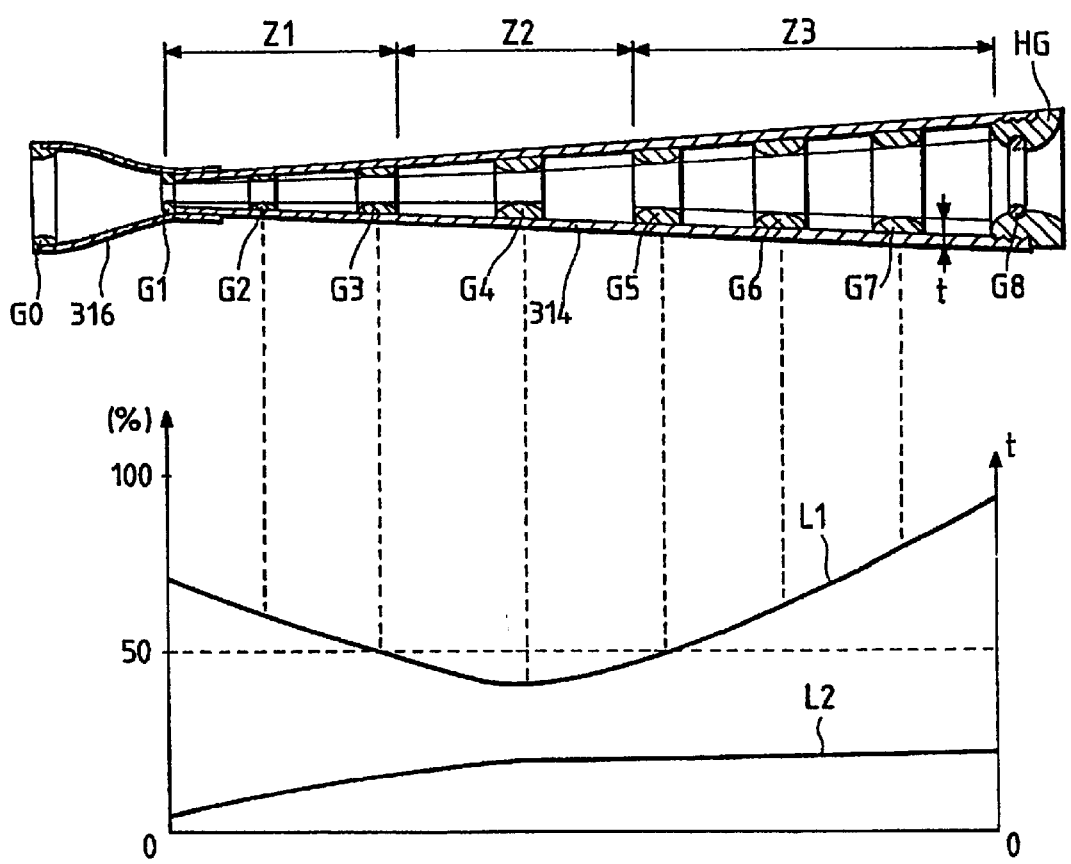
FIG. 18 is a longitudinal section view of the main, portions of the fishing rod shown in FIG. 17.

A longitudinal section view of the top rod 314 is shown in FIG. 18. A hold member HG formed of a resin member or the like is threadedly connected to the rear end of the top rod 314. The hold member HG supports thereon a fishline guide ring G8 formed of ceramics or the like. Also, another guide ring G0 is mounted to the leading end of the top guide member 316. The two fishline guide rings G0, G8 are excluded from the fishline guide rings to be described below. In this embodiment, a fishline guide ring G1 is mounted not on the inner surface of the top rod 314 but in the top end portion thereof and, unlike another fishline guide ring G2 located adjacent to the ring G1, it is formed such that it has a large thickness and has a circular section.

The top rod 314 includes a forwardly tapered inner surface on which fishline guide rings G2 to G7 respectively having different sizes are disposed. Here, the top rod 314 is divided into three portions, that is, a top rod portion Z1, a middle rod portion Z2, and a base-side rod portion Z3 in this order when viewed sequentially from the top portion of the top rod 314. The base-side rod portion Z3 has relatively room for the size of the inside diameter thereof and, therefore, even if the thickness t of the fishline guide members G5, G6 and G7 is set large, they can have relatively large inside diameters. Thus, if a fishline 320 is inserted through them in the casting operation, the resultant insertion resistance of the fishline is small. On the other hand, since water drops are attached to the inner surface of the rod pipe, if the fishline 320 touches the water drops, the resistance of the fishline is large in the casting operation. However, if the respective fishline guide rings G5, G6 and G7 have a given thickness, then the fishline 320 is almost prevented from contacting the rod pipe inner surface of the base-side rod portion Z3 and the water drops, so that the fishline resistance in the casting operation can be reduced.

The inside diameter of the top rod portion Z1 is fairly small and, for this reason, in order to secure a given inside diameter with respect to the size of the fishline 320, the fishline guide rings G2 and G3 are formed in such a manner that. they have a small thickness. In the middle rod portion 22 interposed between the top rod portion Z1 and base-side rod portion Z3, there is provided a fishline guide ring G4 which is substantially equal in thickness to the fishline guide ring G5. The inside diameters of the fishline guide rings G3, G2 and G1 respectively located upstream of the fishline guide ring G4 are set in such a manner that they are not excessively smaller than the inside diameter of the fishline guide ring G4. That is, the respective thicknesses of the fishline guide rings (in the fishline guide ring G1, the amount of inward projection from its rod pipe inner surface position) are set in this manner.

Therefore, the insertion resistance of the fishline 320 in the casting operation can be reduced. Also, in the top portion Z1, the rod inside diameter thereof is very small and thus the fishline is caused to contact the water drops attached to the rod pipe inner surface regardless of the thickness of the fishline guide rings. That is, the resistance of the fishline to the water produced when the fishline guide rings have a small thickness is almost the same as the resistance produced when the fishline guide rings have a large thickness. Accordingly, since the above-mentioned insertion resistance of the fishline 320 to the inside diameter is more important than the resistance of the fishline 320 to the water, the structure of the top rod portion Z1 having an opening rate of 50% or more can reduce the fishline resistance in the casting operation.

In FIG. 18, a line L1 shows the percentage of the inside diameters of the above-mentioned respective fishline guide rings with respect to the rod pipe inside diameters at the corresponding positions. It can be seen from the line L1 that, in the middle rod portion Z2 the percentage is less than 50%, in the top rod portion Z1 the percentage is 50% or more, and in the base-side rod portion Z3 the percentage is sequentially increased over the middle rod portion Z2. Also, as shown by a line L2 in FIG. 18, the thicknesses of the respective fishline guide rings are sequentially decreased from the middle rod portion toward the top end of the top rod portion, while the thicknesses are almost constant from the middle rod portion to the base-side rod portion. However, the thicknesses in the latter portion may be so set as to increase sequentially. This depends on the inside diameter of the rod pipe.

Also, in the foregoing description, the top rod 314 is divided into three rod portions Z1, Z2 and Z3. However, the invention is not limited to the leading rod pipe (that is, top rod) but the invention is to be applied to a rod pipe including a top rod portion regardless of whether connecting portions are present or not.

Figure 19:
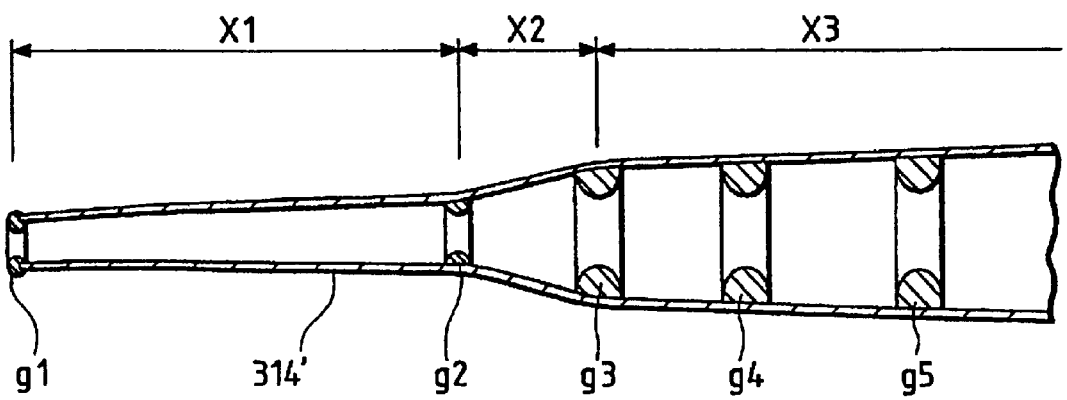
FIG. 19 is a section view of a thirteenth embodiment of a fishing rod with an inserted fishline, corresponding to FIG. 18.

Now, FIG. 19 shows a thirteenth embodiment of a fishing rod with an inserted fishline according to the invention, in which a top rod 314' includes a top rod portion X1 formed in a forwardly and gently tapered shape having inside diameters of 4 mm or less, an enlarged diameter portion X2 formed just in the rear of the top rod portion X1 and formed in a steeply tapered shape, a rear rod portion X3 formed just in the rear of the enlarged diameter portion X2 and formed in a gently tapered shape. On the inner surface of the rear rod portion X3, there are disposed fishline guide rings g3, g4, g5 and the like which are respectively formed of ceramics or the like and have such thicknesses that allow the rings g3, g4, g5 and the like to project inwardly. Due to this structure, when the fishline 320 is inserted through the rear rod portion X3, the fishline 320 can be prevented from contacting the water drops attached to the rod pipe inner surface.

In the front and rear end portions of the top rod portion X1, there are disposed fishline guide rings g1 and g2. However, other fishline guide rings than these two rings are not provided in the top rod portion X1 and the inner surface of the top rod portion X1 is formed in a flat and smooth surface. The rear end portion fishline guide ring g2 is located at a connecting position to the enlarged diameter portion X2. The flat and smooth surface can be formed by winding a fluorine film or a prepreg having a high resin rate round the inside of the top rod 314' when the top rod 314' is formed to thereby form a fluorine layer or a resin layer.

Fishline resistance experiments were conducted in a state where the inner surface of the rod piper was wet, for the rod pipe inside diameters of 2 mm, 4 mm, and 10 mm. The experiments were conducted under two conditions: that is, when the rod pipe inner surface is wet a little, and when the rod pipe inner surface is wet very much just as after the rod pipe is immersed in water. with the inside diameter of 10 mm as a reference, the results of the respective experiments are as follows: that is, under the former condition, for the inside diameter of 4 mm, the fishline resistance was 50% or less and, for 2 mm, the fishline resistance was almost the same as in 4 mm. And, under the latter condition, for 4 mm, the fishline resistance was 67% or less and, for 2 mm, the resistance was less than 50%.

Due to the fact that the state of contact between the fishline 320 and the water drops attached to the rod pipe inner surface varies little when the inside diameter of the rod pipe is larger than 10 mm, it can be estimated that the fishline resistance when the inside diameter is larger than 10 mm remains almost the same as in the inside diameter of 10 mm. By combining this fact with the above-mentioned experimental results, it can be found that the fishline resistance for the inside diameter of the order of 4 mm or less is reduced when compared with the inside diameter larger than 4 mm. This can be considered as follows: that is, when the inside diameter is of the order of 10 mm, the water drops are attached to the inner surface of the rod pipe and the fishline passes through the rod pipe in contact with the water drops; and, on the other hand, when the inside diameter is small, the water drops are joined together to provide a bulk state in the rod pipe, and the fishline passes though the bulk state and receives only the viscous resistance of the water, whereby the resistance of the fishline is smaller than when it is in contact with a large number of water drops.

In a fishing rod with an inserted fishline, in fishing, water penetrates into the rod pipe when the fishline 320 is taken up. In view of this, by providing one or more fishline guide rings in the top rod portion of the top rod, the inside diameter thereof is reduced to prevent the fishline from contacting the water drops attached to the rod pipe inner surface to thereby reduce the resistance of the fishline, although the insertion resistance of the fishline 320 is increased. However, because the water drops are not in the state of water drops but almost in the state of bulk-like water, the resistance of the fishline 320 with respect to the eater makes little difference whether the inside diameters of the fishline guide rings are large or small and, on the contrary, the fishline resistance is increased by the amount of reduction of the inside diameters. Therefore, the structure of the top rod portion X1 of the top rod according to the present embodiment can reduce the fishline resistance when compared with the conventional structures.

In the enlarged diameter portion X2, although the water drops are attached to the inner surface thereof, the water drops are easy to fall down because the inner surface of the enlarged diameter portion X2 is steeply tapered. Also, even if the fishline 320 happens to contact the water drops, the contact area is short and small and thus the fishline resistance cannot be large. Of course, a fishline guide ring may be provided in this area.

Therefore, in the rod pipe having such structure as shown in FIG. 19, the fishline 320 can be little touch the drop-like water and the inside diameter for insertion of the fishline is secured as large as possible, so that the insertion resistance of the fishline can be reduced.

Figure 20:
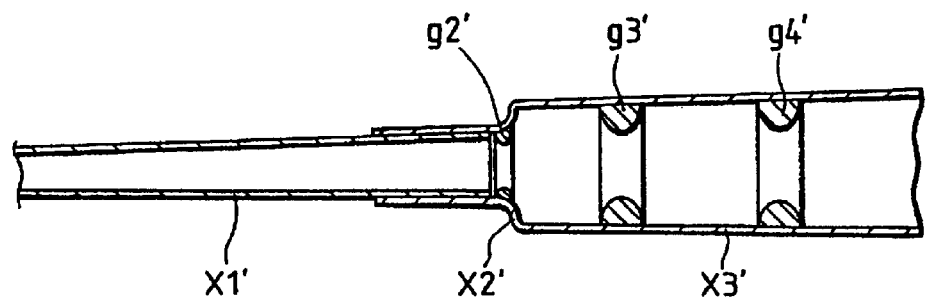
FIG. 20 is a section view of a modification of the: thirteenth embodiment shown in FIG. 19.

In the foregoing description, the top rod 314' is divided into three rod areas or portions X1, X2 and X3 but this is not limitative. The present invention is not limited only to the rod pipe (top rod) located at the leading end portion of the fishing rod but applies to the rod pipe areas of the fishing rod including the top rod area regardless of existence of connecting portions. Therefore, the invention can also apply to an area in which a top rod and a second rod are connected to each other, as shown in FIG. 20. In this case, a top rod portion X1' is a top rod which is connected to a small diameter portion of a rear rod portion X3' (second rod) having a large diameter, and an enlarged diameter portion is formed as a stepped portion X2'. Fishline guide rings g3', g4' and the like provided in the rear rod portion X3' are similar to the fishline guide rings g3, g4 and the like shown in FIG. 19 and, in the stepped portion X2', there is provided a fishline guide ring g2' in the boundary porion thereof to the small diameter portion for connection. Of course, in the leading end portion of the top rod portion X'$_1$, there is disposed a top guide 316 as shown in FIG. 17 or a fishline guide ring g1 as shown in FIG. 19. Further, the stepped portion X2' may be formed in a steeply tapered shape as shown in FIG. 19.

As can be seen clearly from the foregoing description, according to the invention, since balance between the inside diameters of the fishline guide rings provided in the rod pipe including the top rod portion thereof and the inside diameter of the rod pipe is improved, it is possible to supply a fishing rod with an inserted fishline which can efficiently reduce the resistance of the fishline in the casting operation. Therefore, according to the invention, the casting distance of the fishline can be extended.

What is claimed is:

1. A fishing rod in which a fishline is at least partially passed through a rod pipe, said rod pipe comprising:
   a rod pipe main body layer formed by winding a prepeg made of high strength fibers impregnated or mixed with resin having an inner peripheral surface;
   a thin layer disposed on said inner peripheral surface of said rod pipe main body, said thin layer comprising a water repellant material defining a water repellant surface radially inward from said inner peripheral surface of said rod pipe main body; and
   a wear resistant annular fishline guide member fixed to said thin layer, said guide member having a substantial portion extending radially inwardly beyond said water repellant surface, wherein a portion of said thin layer is disposed between said inner peripheral surface of said rod pipe main body and said guide member, and wherein said rod pipe main body layer, said thin layer, and said guide member are integrally thermoformed.

2. A fishing rod according to claim 1, wherein said guide member is at least partially embedded within said thin layer.

3. A fishing rod according to claim 1, wherein said guide member is wound spirally.

4. A fishing rod in which a flsne is at least partially passed through a rod pipe, said rod pipe comprising:
   a rod pipe main body layer formed by winding a prepeg made of high strength fibers impregnated or mixed with resin having an inner peripheral surface;
   a thin layer on said inner peripheral surface of said rod pipe main body, said thin layer comprising a water repellant material defining a water repellant surface radially inward from said inner peripheral surface of said rod pipe main body; and
   a high strength wear resistant member fixed to said thin layer at a radial innermost portion of said thin layer adjacent to said water repellant surface, wherein said rod pipe main body layer, said thin layer, and said high strength wear resistant member are integrally thermoformed.

5. A fishing rod according to claim 4, wherein said high strength wear resistant member is at substantially embedded within said thin layer.

6. A fishing rod according to claim 4 wherein said rod pipe further comprises:
   a wear resistant annular fishline guide member fixed to said thin layer, said guide member having a substantial portion extending radially inwardly beyond said water repellant surface, wherein a portion of said thin layer is disposed between said inner peripheral surface of said rod pipe main body and said guide member.

7. A fishing rod according to claim 6, wherein said guide member is at least partially embedded within said thin layer.

8. An inter-line fishing rod comprising:
   a rod pipe main body layer formed by winding a prepeg made of high-strength fibers impregnated or mixed with resin, said rod pipe main body layer defining an inner peripheral surface;
   a thin layer disposed on said inner peripheral surface of said rod pipe main body layer, said thin layer comprising a water repellant material defining a water repellant surface radially inward from said inner peripheral surface of said rod pipe main body said thin layer defining a water repellant surface more water-repellant than said inner peripheral surface; and
   at least one fishline guide member fixed to said thin layer so that a portion of said fishline guide member is projected radially inwardly from said water repellant surface, wherein a portion of said thin layer is disposed between said inner peripheral surface of said rod pipe main body and said fishline guide member, and wherein said rod pipe main body layer, said thin layer and said guide member are integrally thermoformed.

9. A fishing rod according to claim 8, wherein said guide member is at least partially embedded within said thin layer.

10. A fishing line according to claim 8, wherein said guide member is wound spirally.

11. An inter-line fishing rod comprising:
    a rod pipe main body layer firmed by winding a prepeg made of high-strength fibers impregnated or mixed with resin, said rod pipe main body layer defining an inner peripheral surface; and
    a thin layer disposed on said inner peripheral surface of said rod pipe main body layer, said thin layer comprising a water-repellant material and a high-strength material mixed together, wherein said high-strength material is more water resistant than said water-repellant material, and wherein said rod pipe main body layer and said thin laser are integrally thermoformed.

12. An inter-line fishing rod adapted to receive water repellant material on an internal surface, said rod comprising;
    a rod pipe main body layer formed by winding a prepeg made of high strength fibers impregnated or mixed with resin, said rod pipe main body layer defining an inner peripheral surface; and
    a thin layer disposed on said inner peripheral surface, said thin layer defining a plurality of closely spaced recessed portions on said internal surface defined by high strength members embedded in said layer and projecting radially inward between said recessed portions so that said recessed portions are adapted to receive said water repellant material, said high-strength members being more wear resistant than said water repellant material, wherein said rod pipe main body layer, said thin layer and said high strength members are integrally thermoformed.

13. An inter-line fishing rod according to claim 12, wherein said water repellant material includes a wax.

14. An inter-line fishing rod comprising:
    a rod pipe main body layer formed by winding a prepeg made of high-strength fibers impregnated or mixed with resin, said rod pipe main body layer defining an inner peripheral surface;
    a thin layer disposed on said inner peripheral surface of said rod pipe, said thin layer being more resilient or softer than said rod pipe main body layer and defining an internal surface radially inward from said inner peripheral surface of said rod pipe main body layer; and
    at least one fishline guide member embedded within said thin layer so that a portion of said fishline guide member is projected radially inwardly from said internal surface and a rest of said fishline guide member is embedded within said thin layer, wherein a portion of said thin layer is disposed between said inner peripheral surface of said rod pipe main body and said guide member, and wherein said rod pipe main body layer, said thin layer, and said guide member are integrally thermoformed.

* * * * *